United States Patent [19]

Ohtaki et al.

[11] Patent Number: 5,170,626
[45] Date of Patent: Dec. 15, 1992

[54] HYDRAULIC FLOW CONTROL SYSTEM FOR AUTOMOTIVE VEHICLE

[75] Inventors: Mizuo Ohtaki; Miyoko Hamao, both of Kanagawa, Japan

[73] Assignee: Atsugi Unisia Corporation, Kanagawa, Japan

[21] Appl. No.: 559,684

[22] Filed: Jul. 30, 1990

[30] Foreign Application Priority Data

Jul. 31, 1989 [JP] Japan .................. 1-89160

[51] Int. Cl.$^5$ .................. F16D 31/02; G05D 11/00
[52] U.S. Cl. .................. 60/468; 60/494; 137/115; 137/117
[58] Field of Search .................. 60/459, 468, 494; 137/115, 117; 91/47, 442, 468

[56] References Cited

U.S. PATENT DOCUMENTS

| | | | |
|---|---|---|---|
| 3,367,354 | 2/1968 | Gallant | 137/115 X |
| 4,311,161 | 1/1982 | Narumi et al. | 137/117 |
| 4,343,324 | 8/1982 | Ohe et al. | 137/117 |
| 4,361,166 | 11/1982 | Honaga et al. | 137/117 |
| 4,396,033 | 8/1983 | Narumi et al. | 137/117 |
| 4,420,934 | 12/1983 | Udono | 137/117 X |
| 4,600,071 | 7/1986 | Kitahara et al. | 60/459 x |
| 4,700,733 | 10/1987 | Uchino et al. | 137/117 |
| 4,753,264 | 6/1988 | Uchino et al. | 137/117 |
| 4,768,540 | 9/1988 | Mochizuki et al. | 137/117 |
| 4,917,139 | 4/1990 | Narumi et al. | 137/117 X |
| 5,048,628 | 9/1991 | Rayner | 60/468 X |

Primary Examiner—Edward K. Look
Assistant Examiner—John Ryznic
Attorney, Agent, or Firm—Bachman & LaPoint

[57] ABSTRACT

A hydraulic circuit supplies a controlled hydraulic flow rate to a hydraulically operated automotive component, such as, a power steering unit for satisfying the characteristic function thereof. The hydaulic circuit includes therein a flow control valve unit. In the flow control valve unit, throttle passages are provided each for throttling a hydraulic flow fed from a pump to increase its speed. Orifices are further provided in the flow control valve unit to regulate a hydraulic flow rate to be supplied toward the hydraulically operated automotive component. Each orifice functions to allow less hydraulic flow rate to pass therethrough toward the hydraulically operated automotive component corresponding to increasing speed of a hydraulic flow just upstream thereof. Each orifice is provided between the adjacent throttle passages for preventing the hydraulic flow speed at the throttle passages from directly reflecting on the hydraulic flow speed just upstream of the orifices, thus, ensuring a given minimum hydraulic flow rate for the hydraulically operated automotive component in a range where the hydraulic flow speed at the throttle passages exceeds a given high level.

15 Claims, 5 Drawing Sheets

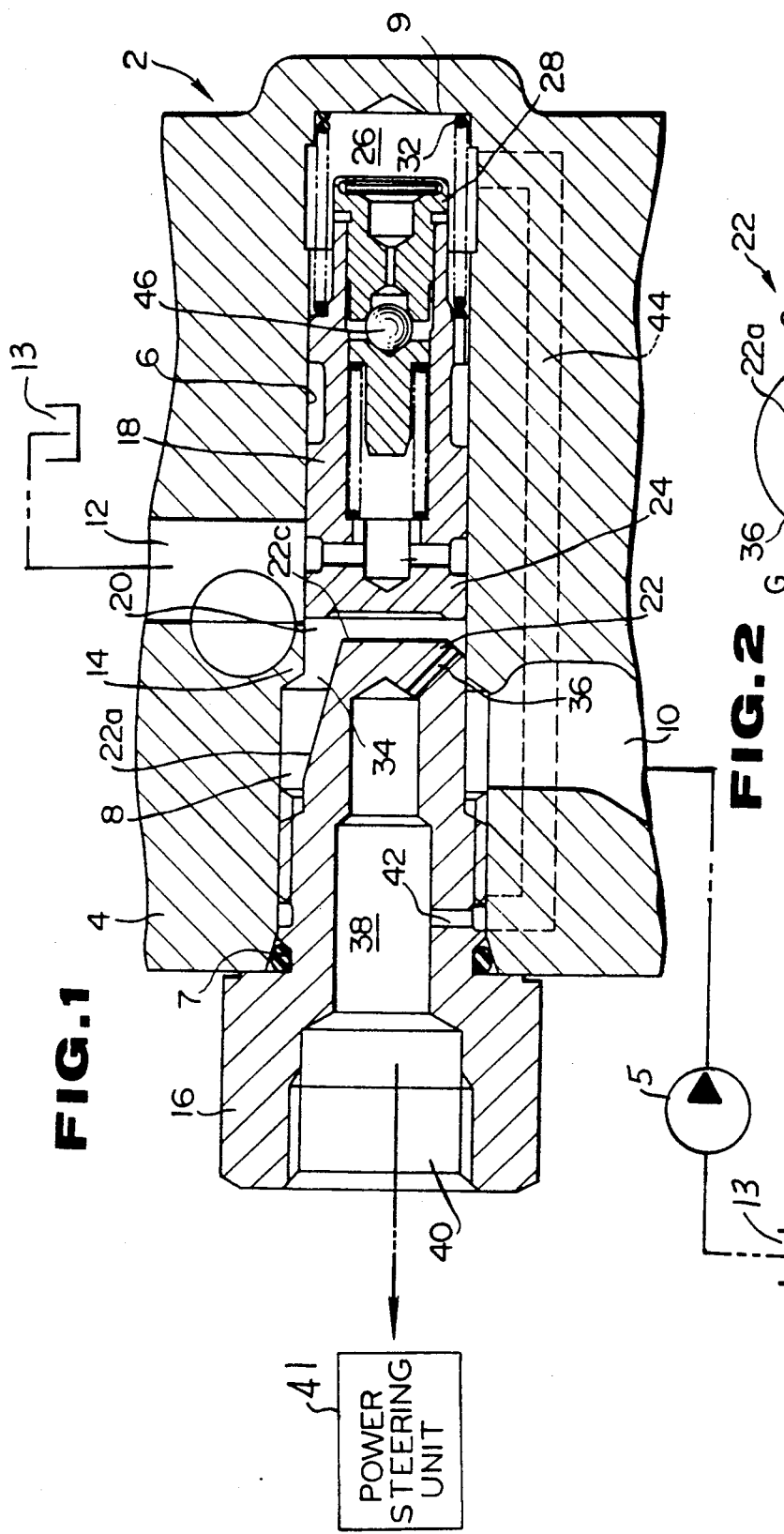
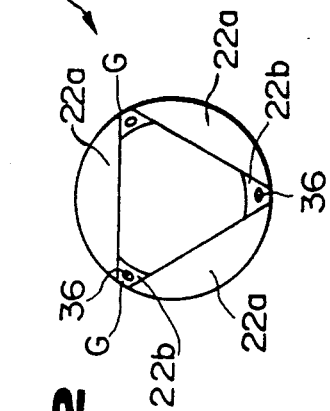
FIG.1
FIG.2

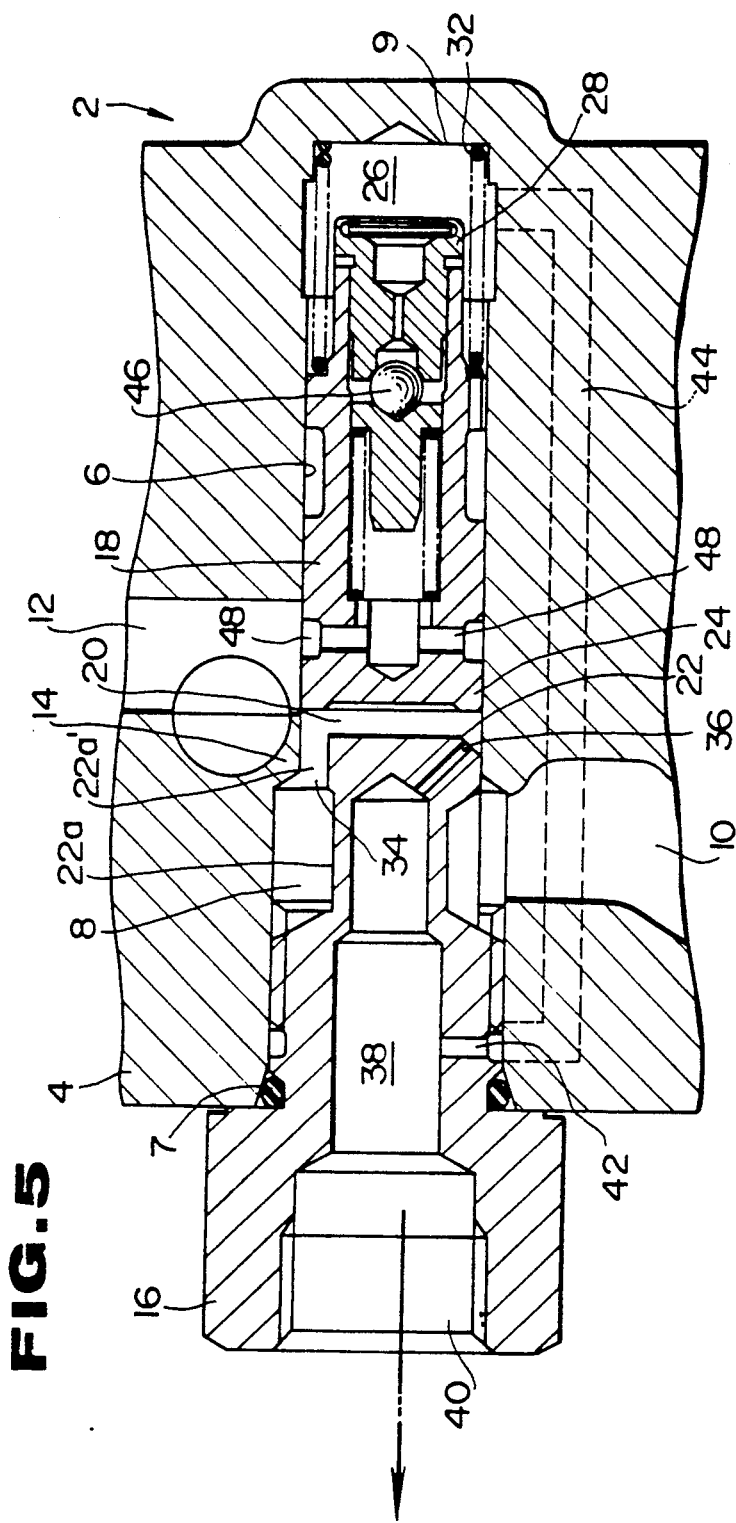
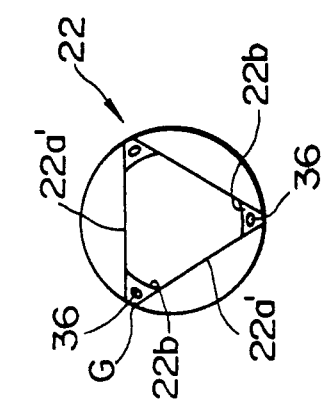
FIG. 5
FIG. 6

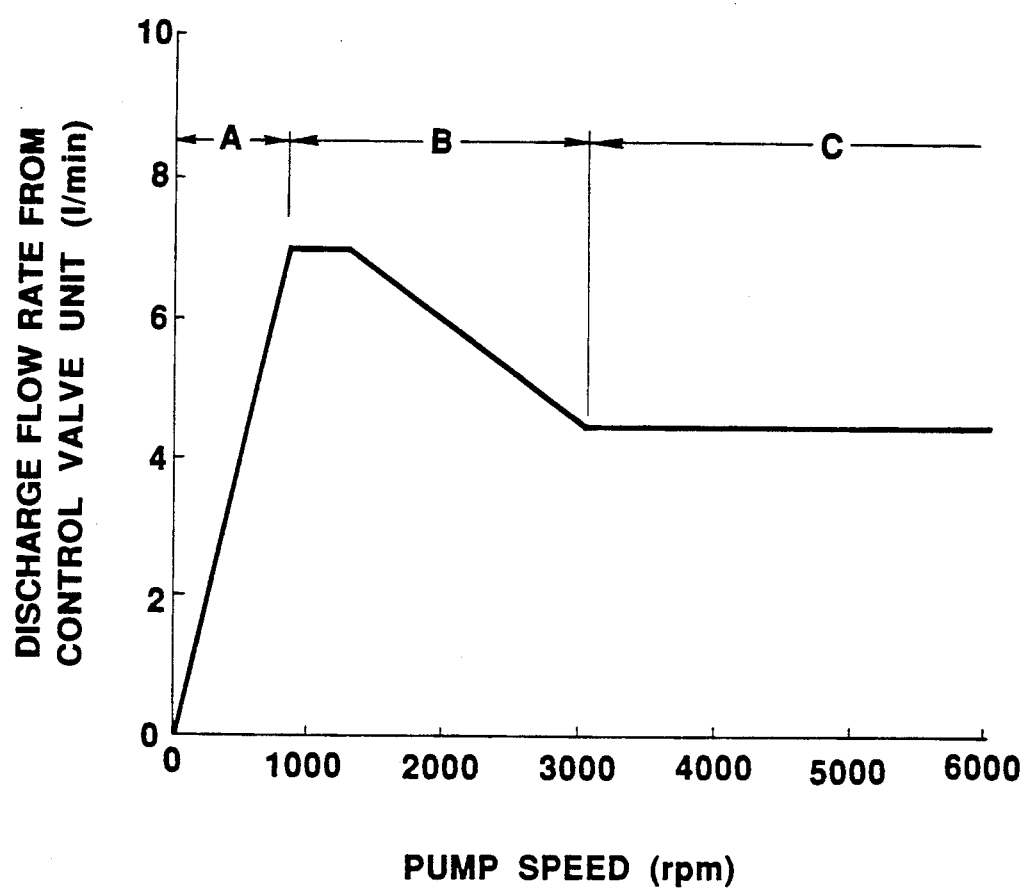

HYDRAULIC FLOW CONTROL SYSTEM FOR AUTOMOTIVE VEHICLE

BACKGROUND OF THE INVENTION

1. Field of the Invention

The present invention relates generally to a hydraulic flow control system for an automotive vehicle, and more specifically, to a hydraulic flow control system for a power steering unit of an automotive vehicle that can feed an optimum hydraulic flow rate to the power steering unit according to a pump speed or an engine speed so as to satisfy characteristic function of the power steering unit.

2. Description of the Background Art

A hydraulic flow control system for an automotive power steering unit is known in the art, such as, disclosed in Japanese First Patent Publication (Tokkaisho) No. 62-152969, wherein a hydraulic flow rate to be supplied to the power steering unit is adjusted according to a pump speed driven by an automotive vehicle engine. Specifically, the hydraulic flow rate is set larger when an engine speed is lower so as to fully assist a driver to operate a steering wheel smoothly in a low speed range of the vehicle, while, the hydraulic flow rate is set less when the engine speed is higher so as to stiffen the steering response for ensuring the driving safety in a high speed range of the vehicle.

In this publication, a flow control valve unit is provided in a hydraulic circuit of the hydraulic flow control system. The flow control valve unit includes a housing which is formed therein with a blind bore having an open end and a closed end axially spacing from each other. The blind bore is connected to a high pressure side of a hydraulic pump which feeds a pressurized working fluid into the hydraulic circuit, via a high pressure passage formed in the housing, and further is connected to a low pressure side of the pump via a bypass passage which is also formed in the housing. A joining point between the high pressure passage and the blind bore is located closer to the open end of the blind bore than that between the bypass passage and the blind bore.

A union is screwed into the blind bore from its open end to have a first end portion located past the joining point between the high pressure passage and the blind bore. The first end portion is formed in a shape of a truncated cone which is tapered toward the closed end of the blind bore. A throttle passage is defined between the peripheral wall of the blind bore and the tapered peripheral wall of the first end portion to throttle the pressurized working fluid fed through the high pressure passage for increasing the speed thereof. A spool valve is slidably disposed in the blind bore to define a first chamber between the tapered first end of the union and a working end of the spool valve and a second chamber between the other working end of the spool valve and the closed end of the blind bore. A spring is disposed in the second chamber for urging the spool valve toward a position where the spool valve fully closes the bypass passage relative to the first chamber. The throttle passage is opened into the first chamber for generating a hydraulic pressure therein.

The union is formed therein with an axial blind bore which is opened toward a second end of the union located away from the tapered first end portion. The union is further formed with orifices at the tapered first end portion. Each orifice opens into the throttle passage at its one end and into the axial blind bore of the union at its other end for conducting a controlled flow rate of the working fluid into the axial blind bore of the union, which is then conducted toward a hydraulically operated automotive component, such as, a power steering unit. The union is further formed with a lateral passage which connects the axial blind bore of the union to the second chamber of the blind bore through a communication passage formed in the housing for introducing a hydraulic pressure generated downstream of the orifices into the second chamber.

The operation of the above-noted background art is as follows:

While a pump speed is within a predetermined low range, since a fluid discharge rate of the pump is small enough to provide a less pressure differential between the first and second chambers than a spring force of the spring applied to the spool valve, the spool valve is retained in the position to fully close the bypass passage relative to the first chamber. Accordingly, all the working fluid supplied through the high pressure passage is fed to the hydraulically operated automotive component through the orifices and the blind bore of the union, and its flow rate increases corresponding to increasing speed of the pump.

On the other hand, when the pump speed exceeds the predetermined low range, a flow speed of the working fluid passing through the throttle passage increases to reduce a static pressure thereof such that the flow rate of the working fluid introduced into the blind bore of the union through the orifices is reduced, while a pressure in the first chamber is increased, to generate a pressure differential between the first and second chambers large enough to overcome the spring force applied to the spool valve. Accordingly, the spool valve displaces to a new balanced position to open the bypass passage relative to the first chamber so as to drain a portion of the working fluid to a fluid reservoir, i.e. to a low pressure side of the pump. In general, a flow rate of the working fluid to be drained gets larger corresponding to increasing speed of the pump.

In the above-noted background art, however, since each of the orifices is opened into the throttle passage, when the pump speed increases to exceed a predetermined high level, the static pressure of the working fluid passing through the throttle passage gets so small that a pressure differential between upstream and downstream of each orifice becomes extremely small or a static pressure upstream of each orifice gets smaller than that downstream thereof, thus resulting in that substantially no working fluid is introduced into the hydraulically operated automotive component through the blind bore of the union.

SUMMARY OF THE INVENTION

Therefore, it is an object of the present invention to provide a hydraulic flow control system for an automotive vehicle that can eliminate the above-noted defects inherent in the background art.

It is another object of the present invention to provide a hydraulic flow control system for an automotive vehicle that can control a hydraulic flow rate supplied to a hydraulically operated automotive component optimumly according to a pump speed even when the pump speed exceeds a predetermined high level.

To accomplish the above-mentioned and other objects, according to one aspect of the present invention, a hydraulic circuit for feeding a controlled hydraulic flow rate to a hydraulically operated automotive component includes therein a flow control valve unit. In the flow control valve unit, throttle passage means is provided for throttling a hydraulic flow fed from a pump to increase its speed. Orifice means is further provided in the flow control valve unit to regulate a hydraulic flow rate to be supplied toward the hydraulically operated automotive component. The orifice means is arranged in such a fashion to allow less hydraulic flow rate to pass therethrough toward the hydraulically operated automotive component corresponding to increasing speed of the hydraulic flow passing through the throttle passage means, while ensuring a given minimum hydraulic flow rate passing therethrough toward the hydraulically operated automotive component during the speed of the hydraulic flow passing through the throttle passage means being larger than a given high level.

According to another aspect of the present invention, a hydraulic circuit for feeding a controlled hydraulic flow rate to a hydraulically operated automotive component, comprises:

a pump which feeds a hydraulic flow into the hydraulic circuit;

a housing formed therein with a bore having a center axis which extends between its open and closed ends, the bore having a first position where a first passage is connected with the bore at its downstream end, the first passage connected at its upstream end with a high pressure side of the pump for conducting the hydraulic flow into the bore, the bore having a second position where a second passage is connected with the bore at its upstream end, the second passage connected at its downstream end with a low pressure side of the pump, the first and second positions spacing a given distance along the center axis from each other and the first position located closer to the open end of the bore than the second position;

a stationary member fixed to the housing and extending from the open end of the bore into the bore to have a first end portion therein, the first end portion extending past the first position toward the closed end of the bore;

a spool valve slidably disposed in the bore between the sationary member and the closed end of the bore to define first and second pressure chambers in the bore, the first pressure chamber formed between the first end portion of the stationary member and the spool valve and the second pressure chamber formed between the spool valve and the closed end of the bore, the spool valve adapted to change its position depending on a pressure differential between the first and second chambers between a third position where the pressure differential is small enough to fully close the second passage relative to the first pressure chamber and a fourth position where the pressure differential is large enough to fully open the second passage relative to the first chamber;

a third passage extending into the stationary member and communicating with the hydraulically operated automotive component at its downstream end, the third passage further communicating with the second pressure chamber through a fifth passage for introducing a hydraulic pressure in the third passage into the second pressure chamber;

throttle passage means, provided between the first position and the first pressure chamber, for throttling the hydraulic flow fed through the first passage toward the first pressure chamber to increase a speed thereof, the speed getting larger corresponding to increasing hydraulic flow rate passing therethrough;

orifice means, formed in the first end portion of the stationary member, for connecting the first pressure chamber to the third passage to provide the pressure differential between the first pressure chamber and the third passage, the orifice means arranged in such a manner to allow less hydraulic flow rate to pass therethrough into the third passage corresponding to increasing speed of the hydraulic flow passing through the throttle passage means, while ensuring a given minimum hydraulic flow rate passing therethrough into the third passage during the speed being larger than a given high level.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings:

FIG. 1 is a cross sectional view showing a flow control valve unit incorporated in a hydraulic circuit according to a first preferred embodiment of the present invention;

FIG. 2 is a front view showing an inner end portion of a connector used in the flow control valve as shown in FIG. 1;

FIG. 5 is a cross sectional view showing a flow control valve unit incorporated in a hydraulic circuit according to a third preferred embodiment of the present invention;

FIG. 6 is a front view showing an inner end portion of a connector used in the flow control valve as shown in FIG. 5;

FIG. 9 is a graph showing a relationship between a hydraulic flow discharge rate of the flow control valve unit and a pump speed.

DESCRIPTION OF THE PREFERRED EMBODIMENT

Figures 3, 4:
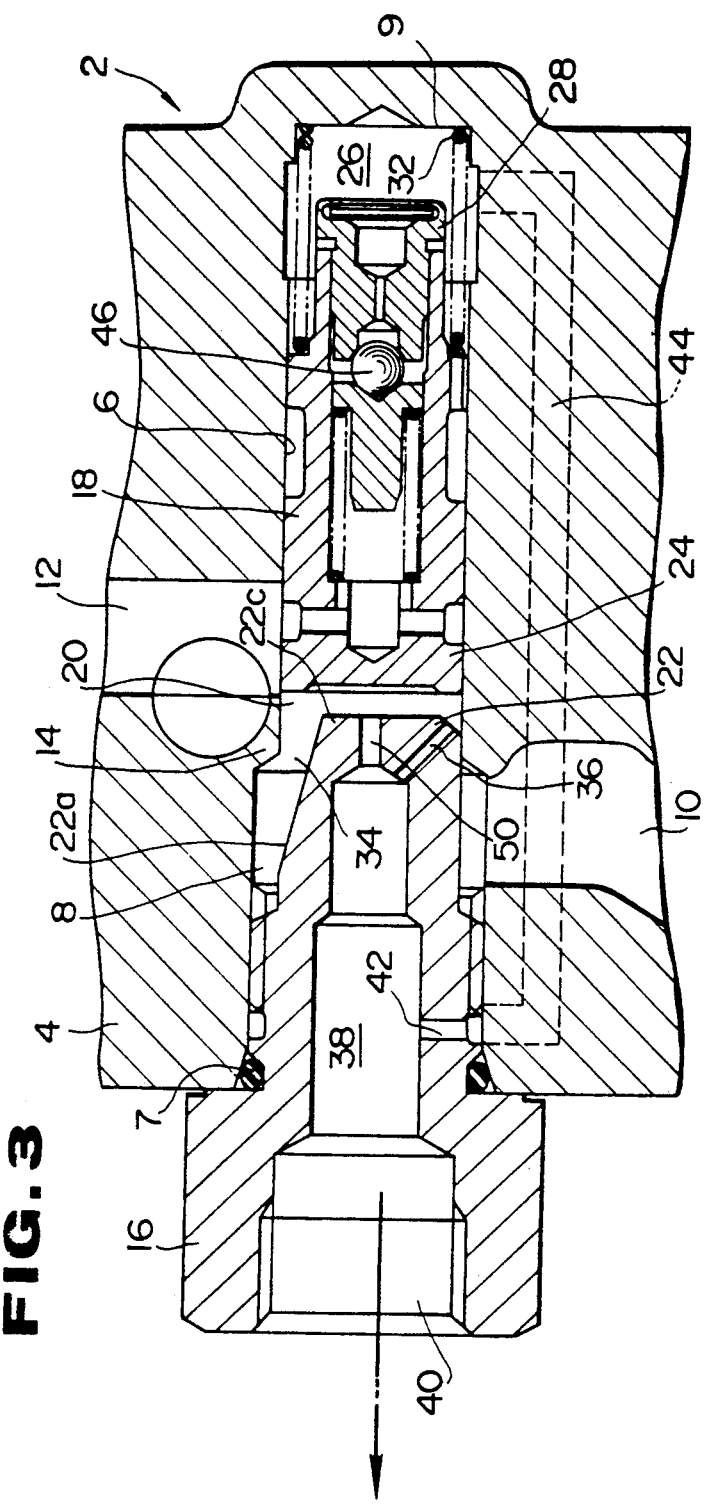
FIG. 3 is a cross sectional view showing a flow control valve unit incorporated in a hydraulic circuit according to a second preferred embodiment of the present invention.
FIG. 4 is a front view showing an inner end portion of a connector used in the flow control valve as shown in FIG. 3.

Referring now to the drawings, first to fourth preferred embodiments of a hydraulic circuit for an automotive vehicle according to the present invention will be described with reference to FIGS. 1 to 9.

FIG. 1 shows a flow control valve unit 2 incorporated in the hydraulic circuit according to the first preferred embodiment. In FIG. 1, the flow control valve unit 2 is arranged in a housing 4 of a hydraulic pump 5 which is driven by an automotive engine and feeds a pressurized working fluid, such as, oil into the hydraulic circuit. A flow discharge rate of the pump increases corresponding to increasing pump speed, i.e. increasing engine speed. An elongate blind bore 6 substantially of a cylindrical shape and having a center axis extending between its open and closed ends 7 and 9 is formed in the housing 4. The elongate blind bore 6 having a first portion formed with an annular groove 8 which is communicated with a high pressure side of the pump through a first passage in the form of a high pressure passage 10 formed in the housing 4. A second passage in the form of a bypass passage 12 is also formed in the housing which connects the blind bore 6 to a fluid reservoir 13, i.e. a low pressure side of the pump. The blind bore 6 is further formed with an annular stepped portion 14 which is located between the annular groove 8 and a joining point between the blind bore 6 and the bypass passage 12, but closer to the annular groove 8.

A stationary member in the form of a connector 16 is screwed into the blind bore 6 from its open end to extend past the annular stepped portion 14. A spool valve 18 is slidably disposed in the blind bore 6 to define a first pressure chamber 20 between an inner end portion 22 of the connector 16 and a working end 24 of the spool valve 18 and a second pressure chamber 26 between the other working end of the spool valve 28 and the closed end 9 of the blind bore 6. A coil spring 32 is disposed in the second pressure chamber 26 to bias the spool valve toward the first pressure chamber 20 or the connector 16. Accordingly, when a pressure differential less than the biasing force of the spring 32 is generated between the first and second pressure chambers 20 and 26, the spool valve is retained in a first position where the bypass passage 12 is fully closed relative to the first pressure chamber by the spool valve 18 to prevent a hydraulic pressure generated in the first pressure chamber from escaping into the low pressure side of the pump through the bypass passage 12.

The inner end portion 22 of the connector 16 is formed tapered toward the first pressure chamber 20. Specifically, as shown in FIG. 2, the inner end portion 22 has three outer peripheral wall surfaces or first slant planar surfaces 22a, 22a, 22a inclined radially inward toward the first pressure chamber 20. The slant surfaces are arranged evenly around the inner end portion 22 with a given small gap G between the adjacent slant surfaces. Each slant surface 22a is located corresponding to the annular groove 8 and the annular stepped portion 14 to define a throttle passage 34 between the annular stepped portion 14 and the slant surface 22a for throttling the working fluid flow fed through the high pressure passage 10 to increase a speed thereof passing through the throttle passage 34.

The inner end portion or truncated conical shaped portion 22 of the connector 16 is further formed with three second planar surfaces or small slant surfaces 22b, 22b, 22b each formed between the adjacent slant surfaces 22a, 22a. Each small slant surface 22b is formed by cutting away a portion between the adjacent slant surfaces 22a, 22a to leave substantially a large planar surface 22c which is perpendicular to the center axis of the blind bore 6 and faces the first pressure chamber 20. Each small slant surface 22b is inclined radially inward toward the first pressure chamber 20. Three first orifices 36 are formed in the inner end portion 22 of the connector 16 each extending in perpendicular to the corresponding small slant surface 22b. Each orifice 36 opens at its upstream end through the corresponding adjacent throttle passages 34, 34 and located downstream of the annular stepped portion 14, and opens at its downstream end into a closed end of a third passage in the form of a center blind bore 38 which is formed in the connector 16 and includes a discharge port 40 at its open end for discharging the working fluid fed through the orifices 36 into the hydraulic circuit toward the hydraulically operated power steering unit 41.

The connector 16 is further formed with a radial passage 42 which connects the center blind bore 38 to the second pressure chamber 26 through a communication passage 44 formed in the housing 4 for conducting a hydraulic pressure generated downstream of the orifices 36 into the second pressure chamber 26.

A relief valve unit 46 is further provided in the second pressure chamber 26. The relief valve unit 46 is opened to relieve an excessive hydraulic pressure into the bypass passage 12 through relief passages 48 in response to generation of a hydraulic pressure exceeding a predetermined high value which is conducted into the second pressure chamber 26 through the radial passage 42 and fifth passage in the form of a communication passage 44 when such a high hydraulic pressure is applied to the center blind bore 38.

The operation of the hydraulic circuit according to the first preferred embodiment will be described hereinbelow.

While a pump speed is within a predetermined low range, since a fluid discharge rate of the pump is small enough to provide a less pressure differential between the first and second pressure chambers 20 and 26 than the biasing force of the coil spring 32 applied to the spool valve 18, the spool valve 18 is retained at the first position to fully close the bypass passage 12 relative to the first pressure chamber 20. Accordingly, all the working fluid supplied through the high pressure passage 10 is fed to the hydraulically operated power steering unit through the orifices 36 and the center blind bore 38, i.e. the discharge port 40, which corresponds to a region A shown in FIG. 9. As seen from FIG. 9, a flow discharge rate in the region A increases as a pump speed increases. Accordingly, during a practical low engine speed range, a vehicle driver is fully assisted to operate the steering wheel smoothly.

On the other hand, when the pump speed exceeds a given level to increase its flow discharge rate, since each orifice 36 is located between the throttle passages 34, the hydraulic flow around upstream of the orifice 36 increases its speed to reduce a static pressure thereof. Accordingly, the hydraulic flow rate introduced into the center blind bore 38 through the orifices 36 gets less to reduce a hydraulic pressure in the second pressure chamber 26, while, the hydraulic pressure in the first pressure chamber 20 gets larger. As a result, a pressure differential between the first and second pressure chambers 20 and 26 becomes larger corresponding to increasing speed of the pump to overcome the biasing force of the coil spring 32 so as to displace the spool valve 18 to a second position to open the bypass passage 12 larger relative to the first pressure chamber 20. Accordingly, more working fluid is drained to the low pressure side of the pump corresponding to increasing speed of the pump to feed less working fluid to the hydraulically operated power steering unit through the discharge port 40 so as to stiffen the steering response. This corresponds to a region B in FIG. 9.

When the pump speed further exceeds a given high level, since each orifice 36 is located between the throttle passages 34 as opposed to the background art, the flow speed of the working fluid passing through the throttle passages 34 does not directly reflect on the flow speed of the working fluid around upstream of the orifices 36. Accordingly, a reduction of the static pressure around upstream of the orifices 36 is restrained as opposed to the background art. Further, since turbulent flows are generated under this high flow speed to cause a certain amount of energy loss, the hydraulic pressure generated in the first pressure chamber 20 is also restrained. Accordingly, the hydraulic flow rate fed to the hydraulically operated power steering unit through the discharge port 40 becomes substantially constant, which corresponds to a region C in FIG. 9.

As described above, in the first preferred embodiment, the optimum hydraulic flow rate is ensured for the hydraulically operated power steering unit over all the practical pump speed or engine speed, i.e. even when the pump speed exceeds the given high level.

FIGS. 3 and 4 show a flow control valve unit incorporated in a hydraulic circuit according to the second preferred embodiment. In FIGS. 3 and 4, the same or like members or components are designated by the same reference numerals as in FIGS. 1 and 2 to omit explanation thereof for avoiding a redundant disclosure.

In the second preferred embodiment, an additional second orifice 50 is formed in the inner end portion 22 of the connector 16. Specifically, the orifice 50 is formed at a center of the inner end portion 22 and extends along the center axis of the blind bore 6. The orifice 50 opens at its upstream end through the planar surface 22c into the first pressure chamber 20 and at its downstream end into the closed end of the blind bore 38 of the connector 16.

Since a pressure differential between the first and second pressure chambers 20 and 26 are maintained substantially constant by the axial movement of the spool valve 18 and since a static pressure reduction due to the increased flow speed at the throttle passages 34 hardly affects the working fluid around upstream of the orifice 50, a substantially constant flow rate is ensured to flow into the blind bore 38 through the orifice 50 over all the practical pump speed. The orifices 36 work in a similar manner as in the first preferred embodiment. Accordingly, a flow rate characteristic similar to that of FIG. 9 is attained in the second preferred embodiment.

FIGS. 5 and 6 show a flow control valve unit incorporated in a hydraulic circuit according to the third preferred embodiment. In FIGS. 5 and 6, the same or like members or components are designated by the same reference numerals as in FIGS. 1 and 2 to omit explanation thereof for avoiding a redundant disclosure.

In the third preferred embodiment, each slant surface 22a is formed in parallel to the center axis of the blind bore 6. Further, each slant surface 22a has a radially outward projection 22a at its tip adjacent to the first pressure chamber 20. Each projection 22a' extends in parallel to the center axis of the blind bore 6 to form the throttle passage 34 between itself and the stepped portion 14. The other structure is substantially the same as in the first preferred embodiment.

Since the orifices 36 work in the same manner as in the first preferred embodiment, a flow rate characteristic similar to that of FIG. 9 is attained also in the third preferred embodiment.

Figure 7:
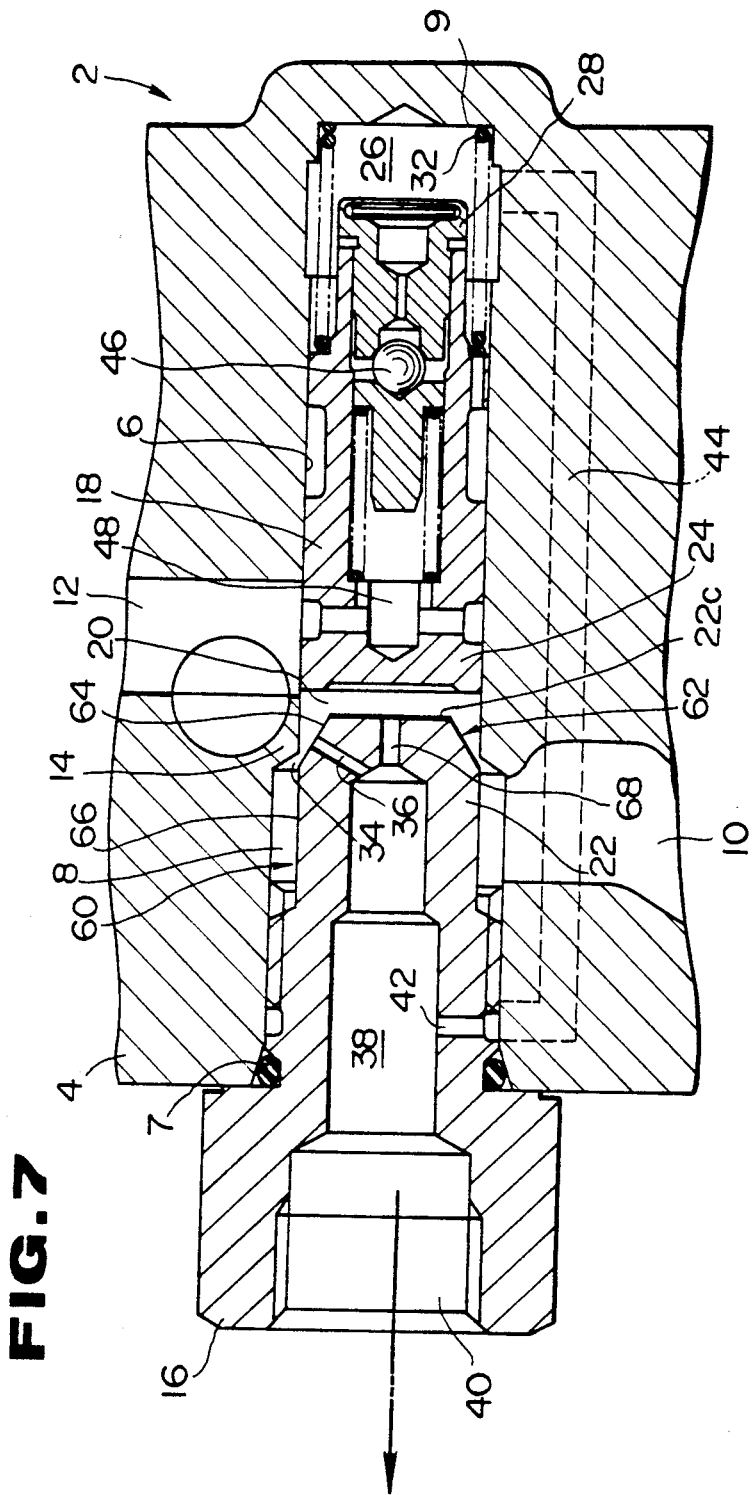
FIG. 7 is a cross sectional view showing a flow control valve unit incorporated in a hydraulic circuit according to a fourth preferred embodiment of the present invention.
Figure 8:
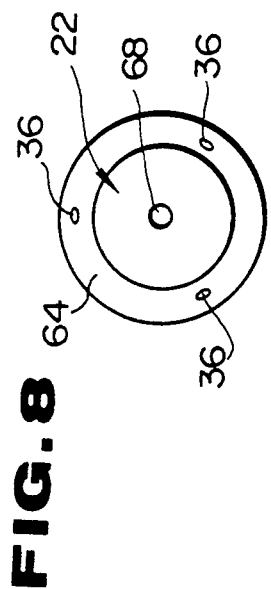
FIG. 8 is a front view showing an inner end portion of a connector used in the flow control valve as shown in FIG. 7.

FIGS. 7 and 8 show a flow control valve unit incorporated in a hydraulic circuit according to the fourth preferred embodiment. In FIGS. 7 and 8, the same or like members or components are designated by the same reference numerals as in FIGS. 1 and 2 to omit explanation thereof for avoiding a redundant disclosure.

In the fourth preferred embodiment, the inner end portion 22 of the connector 16 is formed substantially cylindrical as seen from FIG. 8. Specifically, the cylindrical inner end 22 has a first portion 60 and a second portion 62. An outer peripheral surface 66 of the first portion 60 is located at a portion corresponding to the annular groove 8 and extends in parallel to the center axis of the blind bore 6. On the other hand, an outer peripheral surface 64 of the second portion 62 is located at a portion corresponding to the annular stepped portion 14 and is formed tapered toward the first pressure chamber 20. An annular throttle passage 34 is formed between the annular stepped portion 14 and the tapered peripheral surface 64. As shown in FIG. 8, the three orifices 36 are formed at the tapered peripheral surface 64 evenly distributed therearound. An additional orifice 68 is formed at the center of the second portion 62 in the same manner as the orifice 50 in FIGS. 3 and 4.

The orifices 36 work in a similar manner as in the first preferred embodiment and the additional orifice 68 works in a similar manner as in the second preferred embodiment. Accordingly, a flow rate characteristic similar to that of FIG. 9 is attained also in the fourth preferred embodiment.

It is to be understood that this invention is not to be limited to the preferred embodiments described above, and that various changes and modifications may be made without departing from the spirit and scope of the invention as defined in the appended claims.

For example, the number of the planar surfaces 22a of the inner end portion 22 of the connector 16 is not limited to three, and may also be more than three.

What is claimed is:

1. A hydraulic circuit for feeding a controlled hydraulic flow rate to a hydraulically operated automotive component, comprising:
 a pump which feeds a hydraulic flow into the hydraulic circuit;
 a housing formed therein with a bore having a center axis which extends between its open and closed ends, said bore having a first portion where a first passage is connected with the bore at its downstream end, said first passage connected at its upstream end with a high pressure side of the pump for conducting the hydraulic flow into the bore, said bore having a second portion where a second passage is connected with the bore at its upstream end, said second passage connected at its downstream end with a low pressure side of the pump, said first and second portion being spaced at a given distance along said center axis from each other and said first portion being located closer to the open end of the bore than said second portion;
 a stationary member fixed to said housing and extending from the open end of the bore into the bore and having a first end portion, said first end portion extending past said first portion of the bore toward the closed end of the bore;
 a spool valve slidably disposed in the bore between said stationary member and the closed end of the bore to define first and second pressure chambers in the bore, said first pressure chamber formed between said first end portion of the stationary member and the spool valve and said second pressure chamber formed between said spool valve and the closed and of the bore, said spool valve adapted to change its position depending on a pressure differential between said first and second chambers between a first position where said pressure differential is small enough to fully close said second passage relative to said first pressure chamber and a second position where said pressure differential is large enough to fully open said second passage relative to said first chamber;

a third passage extending into said stationary member and communicating with said hydraulically operated automotive component at its downstream end, said third passage further communicating with said second pressure chamber through a fifth passage for introducing a hydraulic pressure in the third passage into said second pressure chamber;

throttle passage means formed between the peripheral wall of the bore and the outer peripheral wall of the first end portion of the stationary member for throttling the hydraulic flow fed through said first passage toward said first pressure chamber to increase a speed thereof, said speed getting larger corresponding to increasing hydraulic flow rate passing therethrough;

orifice means, formed in said first end portion of the stationary member, for connecting said first pressure chamber to said third passage to provide said pressure differential between said first pressure chamber and said third passage, said orifice means arranged in such a position associated with said throttle passage means as to enable said orifice means to conduct less hydraulic flow rate therethrough into said third passage corresponding to increasing speed of the hydraulic flow passing through said throttle passage means, while enabling said orifice means to ensure a given minimum hydraulic flow rate passing therethrough into said third passage during said speed being larger than a given high level.

2. The hydraulic circuit as set forth in claim 1, wherein said throttle passage means is formed between a stepped portion formed on a peripheral wall of said bore and an outer peripheral wall of said first end portion of the stationary member.

3. The hydraulic circuit as set forth in claim 1, wherein said first end portion of the stationary member includes no less than three first planar surfaces evenly arranged around said first end portion, each of said first planar surfaces inclined toward said center axis in a direction toward said first pressure chamber, and wherein said throttle passage means includes throttle passages each being formed between one of said first planar surfaces and a stepped portion formed on a peripheral wall defining said bore.

4. The hydraulic circuit as set forth in claim 3, wherein said orifice means includes first orifices each opening into a space between the adjacent throttle passages at its one end and into said third passage at its other end.

5. The hydraulic circuit as set forth in claim 4, wherein a second planar surface is provided between each adjacent pair of said first planar surfaces, said second planar surface each inclined toward said center axis in a direction toward said first pressure chamber, each of said first orifices opening into said space through said second planar surface and extending in perpendicular to said second planar surface.

6. The hydraulic circuit as set forth in claim 5, wherein a second orifice is provided in said first end portion of the stationary member, said second orifice extending along said center axis and opening into said first pressure chamber at its one end and into said third passage at its other end.

7. The hydraulic circuit as set forth in claim 5, wherein said second orifice is arranged in alignment with said center axis.

8. The hydraulic circuit as set forth in claim 1, wherein said first end portion of the stationary member includes no less than three first planar surfaces evenly arranged around said first end portion, each of said first planar surfaces extending in parallel to said center axis, and wherein said throttle passage means includes throttle passages each being formed between one of said first planar surfaces and a stepped portion formed on a peripheral wall defining said bore.

9. The hydraulic circuit as set forth in claim 8, wherein said orifice means includes first orifices each opening into a space between the adjacent throttle passages at its one end and into said third passage at its other end.

10. The hydraulic circuit as set forth in claim 9, wherein a second planar surface is provided between each adjacent pair of said first planar surfaces, said second planar surface each inclined toward said center axis in a direction toward said first pressure chamber, each of said first orifices opening into said space through said second planar surface and extending in perpendicular to said second planar surface.

11. The hydraulic circuit as set forth in claim 10, wherein a second orifice is provided in said first end portion of the stationary member, said second orifice extending along said center axis and opening into said first pressure chamber at its one end and into said third passage at its other end.

12. The hydraulic circuit as set forth in claim 11, wherein said second orifice is arranged in alignment with said center axis.

13. The hydraulic circuit as set forth in claim 1, wherein said first end portion of the stationary member includes a truncated conical shaped portion tapering toward said first pressure chamber, said truncated conical shaped portion facing said first pressure chamber, and wherein said throttle passage means includes a throttle passage formed between a tapered peripheral wall of said truncated conical shaped portion and a stepped portion formed on a peripheral wall defining said bore.

14. The hydraulic circuit as set forth in claim 13, wherein said orifice means includes first orifices each opening into said throttle passage through said tapered peripheral wall at its one end and into said third passage at its other end and extending in perpendicular to said tapered peripheral wall, and wherein a second orifice is provided in said truncated conical shaped portion, said second orifice extending along said center axis and opening into said first pressure chamber at its one end and into said third passage at its other end.

15. The hydraulic circuit as set forth in claim 14, wherein said second orifice is arranged in alignment with said center axis.

* * * * *